(12) United States Patent
Ara et al.

(10) Patent No.: US 8,084,551 B2
(45) Date of Patent: Dec. 27, 2011

(54) METHOD FOR PLASTICIZING LACTIC ACID POLYMERS

(75) Inventors: Paolo Ara, Barcelona (ES); José María Garreta-Such, legal representative, Barcelona (ES); Stefano Fiori, Mataro (ES)

(73) Assignees: Marco Paolo Ara, Barcelona (ES); Patricia Marina Ara, Barcelona (ES)

( * ) Notice: Subject to any disclaimer, the term of this patent is extended or adjusted under 35 U.S.C. 154(b) by 0 days.

(21) Appl. No.: 12/864,093

(22) PCT Filed: Jan. 25, 2008

(86) PCT No.: PCT/ES2008/000038
§ 371 (c)(1),
(2), (4) Date: Jul. 22, 2010

(87) PCT Pub. No.: WO2009/092825
PCT Pub. Date: Jul. 30, 2009

(65) Prior Publication Data
US 2011/0054099 A1    Mar. 3, 2011

(51) Int. Cl.
*C08G 63/08* (2006.01)
(52) U.S. Cl. .......... 525/450; 241/23; 428/402; 525/410; 525/411; 525/415; 528/354; 528/361
(58) Field of Classification Search .............. 241/23; 428/402; 525/354, 361; 528/410, 411, 415, 528/450
See application file for complete search history.

(56) References Cited

U.S. PATENT DOCUMENTS

| | | | | |
|---|---|---|---|---|
| 5,180,765 A | * | 1/1993 | Sinclair | .................. 524/306 |
| 5,424,346 A | | 6/1995 | Sinclair | |

FOREIGN PATENT DOCUMENTS

| | | |
|---|---|---|
| EP | 1589075 | 10/2005 |
| ES | 2017562 | 2/1991 |
| JP | 6306264 | 1/1994 |
| JP | 2006152102 | 6/2006 |
| WO | WO9204413 | 3/1992 |

OTHER PUBLICATIONS

Ke, T.; Sun, S.X.; Seib, P.; Journal of Applied Polymer Science, 2003, vol. 89, p. 3639-3646.*

* cited by examiner

*Primary Examiner* — James J Seidleck
*Assistant Examiner* — Robert Jones, Jr.
(74) *Attorney, Agent, or Firm* — Pravel Intellectual Property Law, P.C.; James W. Pravel

(57) ABSTRACT

Plasticization process for lactic acid polymers characterized in that it includes the grinding of the lactic acid polymers, the mixing of said ground and solid state lactic acid polymers, with mixtures of lactic acid oligomers, the subjecting of the mixture to a temperature of between 150° C. and 200° C. and at a pressure of between 1.4 bar and 4 bar, and the making up of the mixture, in a period of time of less than 30 minutes from the moment the lactic acid oligomers come in contact with lactic acid polymers.

14 Claims, No Drawings

METHOD FOR PLASTICIZING LACTIC ACID POLYMERS

FIELD OF THE INVENTION

A process for production plasticized lactic acid polymers with mixtures of lactic acid oligomers.

BACKGROUND TO THE INVENTION

The so called bio-polymers, obtained from renewable sources, form a new generation of polymers whose two main characteristics have to be: a) that oil derivatives are not part of their make up and b) that they do not cause the environmental impact like the plastics manufactured from said oil derivatives. The ideal bio-polymer will easily degrade in nature, after which its components will be reincorporated in the food chain of our planet.

The current state of the art is capable of industrially producing certain commercially useable bio-polymers, but there are still other commercial applications remaining that, due to the features necessary in these types of materials, still have to use oil derivatives.

An example of a bio-polymer is that which is obtained by means of the polymerisation of 2-hydroxy-propanoic acid (lactic acid) monomer industrially obtained by fermentation from Bacillus theroamylovorans from certain industrial waste products, such as from the glucose remaining in the molasses waste of industrial sugar plants. The lactic acid is the most economical biomonomer, industrially polymerizable for example in the presence of sulphuric acid as a catalyser.

The natural breakdown speed of the lactic acid polymer, hereinafter called polylactates and represented by the acronym PLA, is comparable to that of the ordinary vegetable materials and on occasions is very fast. In this process factors such as humidity or certain bacteria that already exist in nature play a part. On the other hand the mechanical features of the PLAs are comparable to those of certain thermoplastics produced from oil, such as polyethylene or poly (vinyl chloride).

The pure PLA usually has a relatively high crystalinity, which gives it high fragility properties. The production of thin flexible PLA films therefore needs plasticizers. But the current plasticizers of the acrylic polyadipate or diesters of certain types of polyethylenglycols used in the manufacture of thin films of polyethylene or poly(vinyl chloride) have limited compatibility with PLA and their slow eco-degradability is a disadvantage when the polymer is PLA. The combination of these circumstances means that the plastics industry cannot currently offer thin and flexible polyacetate films to the food industry.

DESCRIPTION OF THE INVENTION

The object of this present invention is to solve the current problems in the production of easily eco-degradable PLA flexible films by means of the following steps or phases:
a) The grinding of the lactic acid polymers,
b) The mixing of said lactic acid polymers, ground and solid state, with mixtures of lactic acid oligomers.
c) The subjecting of the mixture to a temperature from 150° C. to 200° C. and a pressure of between 1.4 and 4 bars.
d) The composition of the mixture, in a period of time of less than 30 minutes from the entry into contact of the lactic acid oligomers and the lactic acid polymers.

The oligomer mixtures, hereinafter called OLA, can have either the carboxyl group or equally the final free hydroxyl group, or equally any of them can be blocked by esterification, or equally both can be esterified.

The function of the plasticizer consists of providing low weight molecular chains that, mixed with the chains of the final polymers, will prevent the crosslinking of the macro molecule chains resulting in high rigidity of the final product. In the present invention, the mechanical properties of the PLA, such as the flexibility of the final product, will depend on the quantity of oligomers added likewise the physical-chemical characteristics of these, such as the distribution of the molecular weight or the possible esterifying agents of the final functional groups of the OLA.

The OLA with free functional groups is not appreciably incorporated into the PLA chains to form part of them because the possibility of reaction between oligomer and polymer during the mixture or the subsequent solid state is so small that it does not manifest itself during the useful life of the PLA plasticized with OLA.

The torque curve (curves that represent the plasticizing power of the product) for the cases of different PLAs plasticized with different OLAs are very similar to those obtained in the cases of PLAs with other plasticizers such as polyadipate or the adipate of di-2-ethylhexyl.

The response of these PLA+OLA films to the study by means of calorimetric differential sweep indicates:
1. The transparency and high level of homogeneity of the films, which means a correct interaction between PLA and OLA.
2. The glass transition temperature $T_g$, that in an amorphous or semi-crystalline polymer indicates the change of state from "solid" to "viscous-fluid", is lower on having a greater quantity of OLA, which comes within the normality hence an increase of plasticizing always means a fall of said $T_g$. This experimental result confirms that the OLA is not incorporated into the PLA.
3. The films with 20% of OLA have a $T_g$ value that continues being suitable for its commercial use.

The flexibility of the PLA films plasticized with OLA has been compared to the flexibility of the PLA films plasticized with polyadipate known commercially under the name of Glyplast 206/3, hereinafter G206/3. This comparison has been carried out measuring the resistance properties to traction and the percentage of elongation before breaking. On order to do this the UNE-53100-85 (ISO 1628-2:1999) standard has been followed using an Instron test machine. For these comparative analyses an OLA with an average molecular weight of 997 was used.

The values of the tensile resistance of the PLA films plasticized with OLA vary in a similar way to those obtained in the same G206/3 concentration intervals in the PLA films;

| Film | Resistance to Traction in MPa |
|---|---|
| PLA + OLA 10% | 34.9 ± 1.3 |
| PLA + OLA 20% | 12.6 ± 1.2 |
| PLA + G206/3 10% | 18.9 ± 2.5 |
| PLA + G206/3 20% | 16.5 ± 1.9 |

In the plasticizing with OLA, the elongation capacity of the PLA before breaking is advantageously greater to the capacity of the PLA plasticized with the same percentage of G206/3:

| Film | % elongation before breaking |
|---|---|
| PLA + OLA 20% | 329.1 ± 47 |
| PLA + G206/3 20% | 254.9 ± 29.9 |

The evaluation of the homogeneity in samples with different proportions of OLA, likewise an approximation to its transparency, was brought to a conclusion using a confocal laser microscope and the electronic scanning microscope. In none of the films examined can problems of homogeneity be appreciated, at the same time a very high transparency is noted. Both characteristics can be appreciated simply by eye.

The optimum average molecular weight of the oligomers for the present invention is of a value greater than 200 and does not exceed 2000. Within this general interval, the features that are wanted in the film will be those that will fix the physical-chemical properties of the OLA to be used in the plasticizing.

The thin, flexible PLA films obtained, in addition to offering remarkable advantages in the food industry, show mechanical features similar to those of the flexible thin films of poly (vinyl chloride) or of polyethylene, but with the ecological advantage of being degradable at the same or at a greater speed to that of soft vegetable tissue under equal conditions.

These and other characteristics of the invention, including the claims, will be understood with greater ease in view of the examples of the embodiment.

PREFERRED EMBODIMENT OF THE INVENTION

A mixture of lactic acid oligomers is obtained with the carboxyl group terminal blocked, with good plasticizing properties for the effects of the purpose of this present invention, heating a mixture of lactic acid in a concentrated aqueous solution in the presence of a catalyst, such as methasulphonic acid or sulphuric acid, and an alcohol of between 2 and 18 atoms of carbon, such as butanol, 1-nonanol, or ethylglycol or any polyethylglycol.

The production of thin, flexible polylactate films by means of lactic acid oligomers is made by any of the normal industrial process for the production of such thin, flexible films, when the polymer is another, such as poly (vinyl chloride) or polyethylene. Such process consists of subjecting a mixture of PLA and OLA to suitable pressure, temperatures and machining, for example in an extrusion and lamination machine.

EXAMPLE 1

Production of Blocked Lactic Acid Oligomers

The following is loaded into a 2 kg capacity reactor in a nitrogen atmosphere:
  500 g of 85% lactic acid aqueous solution
  200 g of a commercial mixture of 1-octanol and 1-decanol in an approximate 1:1 proportion.
  2.0 g of sulphuric acid
The mixture is heated under agitation to 150° C.
  1. During the first two hours the water initially present in the reaction mixture in addition to the water that is formed during esterification is separated by distillation at atmospheric pressure.
  2. During the next seven hours of reaction, the distillation of the water is done in a gradually increasing vacuum, beginning at 600 mbar and finishing up at 80 mbar.
  3. During the next six hours of distillation the vacuum is done at the maximum which allows the water jet.

Total reaction time is 15 hours. 480 g of a mixture of oligomers is obtained with a density of 1.1 g/cm$^3$, acid index 1.48 mgKOH/g of product, cinematic viscosity at 25° C. of 279 centistokes and dynamic viscosity of 307 centipoises. Average molecular weight=400

EXAMPLE 2

Production of Blocked Lactic Acid Oligomers

The following components are loaded into a 2 kg capacity reactor in a nitrogen atmosphere:
  650 g of 85% lactic acid aqueous solution
  260 g of a commercial mixture of 1-heptanol and 1-nonanol in an approximate 1:1 proportion.
  2.7 g of sulphuric acid
The mixture is heated under agitation to 150° C.
  1. During the first one and one half hours the water initially present in the reaction mixture in addition to the water that is formed during esterification is separated by distillation at atmospheric pressure. 160 g of water is collected
  2. During the next nine hours of reaction, the distillation of the water is done in a gradually increasing vacuum, beginning at 600 mbar and finishing up at 40 mbar.
  3. During the next one hour of distillation the vacuum is done at the maximum which allows the water pump.

Total reaction time is 11.5 hours. 594 g of a mixture of oligomers is obtained with a density of 1.05 g/cm$^3$, acid index 1.9 mgKOH/g of product, cinematic viscosity at 25° C. of 160 centistokes and dynamic viscosity of 170 centipoises. Average molecular weight=293

EXAMPLE 3

Production of Blocked Lactic Acid Oligomers

The following is loaded into a 2 kg capacity reactor in a nitrogen atmosphere:
  650 g of 85% lactic acid aqueous solution
  200 g of a commercial mixture of 1-heptanol and 1-nonanol in an approximate 1:1 proportion.
  2.6 g of sulphuric acid
The mixture is heated under agitation to 150° C.
  1. For three and one half hours the water initially present in the reaction mixture in addition to the water that is formed during esterification is separated by distillation at atmospheric pressure.
  2. During the next eight hours of reaction, the distillation of the water is done in a gradually increasing vacuum, beginning at 600 mbar and finishing up at 40 mbar.
  3. During the next four hours of distillation the vacuum is done at the maximum which allows the water pump.

Total reaction time is 15.5 hours. 585 g of a mixture of oligomers is obtained with a density of 1.1 g/cm$^3$, acid index 2.5 mgKOH/g of product, cinematic viscosity at 25° C. of 1104 centistokes and dynamic viscosity of 1214 centipoises. Average molecular weight=400

EXAMPLE 4

Production of Blocked Lactic Acid Homooligomers

The following is loaded into a 2 kg capacity reactor in a nitrogen atmosphere:

1. 800 g of 85% lactic acid aqueous solution
2. 8 g of sulphuric acid

The mixture is initially heated under agitation to 120° C.
1. For two hours the water initially present in the reaction mixture in addition to the water that is formed during esterification is separated by distillation at atmospheric pressure.
2. During the next 4 hours of the reaction the temperature is gradually increased up to 130° C. at the same time as distilling the water in an initial vacuum of 600 mbar that is increased up to 30 mbar. At this point the reaction mixture is made up of a mixture of oligomers with a very narrow dispersion in its molecular weights, which for practical purposes will be a "homo-oligomer". This mixture is too viscose for manipulation. After 4 hours 377 g of 1-butanol is added. The 1-butanol will block the carboxyl terminal in the homo-oligomer and it will cause a brusque reduction of the viscosity of the reaction mixture. The temperature will go down to 115° C.
3. During the following 2 hours of reaction the distilled 1-butanol is replaced. Once the time range has finished the 1-butanol is not recycled again.
4. After an elapse of 1 more hour (total reaction time of 9 hours), an additional 40 g of 1-butanol is added.
5. The reaction is continued for a further 4 hours under the same conditions (total reaction time of 13 hours), after which the vacuum is broken and the reaction temperature is increased to 130° C.
6. Half an hour later an additional 40 g of 1-butanol is added to the reaction medium and the reaction is kept up under the same conditions of 130° C. temperature and distillation at atmospheric pressure for a further 3.5 hours.

Total reaction time is 17 hours. 1,500 g of homo-oligomers are obtained with a density of 1.06 g/cm$^3$, acid index 5 mgKOH/g of product, cinematic viscosity at 25° C. of centistokes and dynamic viscosity of 29 centipoises. Average molecular weight=450

Notes:

If instead of adding alcohols to the reaction medium organic acids or a derivative of an organic acid is added, such as acetic anhydride, the hydroxyl terminal groups of the oligomers will be blocked.

If a suitable acid is added to the reaction medium with the oligomers of the esterified carboxyl terminal group, such as acetic anhydride, and the medium is kept under suitable conditions, for example atmospheric pressure and a temperature of 130° C. whilst the free acetic acid that is forming is distilled, an OLA with both esterified terminal groups will be obtained. The carboxylic radical in accordance with this option linked to the OLA can have between 2 and 18 carbon atoms.

If no alcohol at all is added to the reaction medium such as the one in example 4, an OLA is obtained with both free terminal groups.

EXAMPLE 5

Producing Flexible Films of Plasticized Polyactate by Means of Lactic Acid Oligomers The PLA is ground until the grain size is less than 0.25 mm in diameter. The ground material is kept at 5° C. in an atmosphere of 50% humidity.

In industrial "compounding" equipment by means of double screw extrusion press a homogeneous mixture is prepared of 85 kg of ground PLA in accordance with the previous paragraph and 15 kg of OLA, in the form of a paste, at an initial temperature of 170° C., at 50 rpm and for 8 minutes.

Next 80 kg of a mixture prepared in accordance with the previous paragraph is introduced into an industrial type of extrusion and lamination machine, where the material is subjected to a temperature of 180° C. and a roller pressure of 2.5 bars. 726 m$^2$ of a homogeneous and flexible film with a 0.1 mm thickness is obtained.

The invention claimed is:
1. A plasticization process for lactic acid polymers comprising the steps of:
   a) Grinding of the lactic acid polymers,
   b) Mixing of said lactic acid polymers, in ground and solid state, with mixtures of lactic acid oligomers, and
   c) Subjecting the mixture to a temperature of from 150° C. to 200° C. and a pressure of between 1.4 and 4 bars for a period of time less than 30 minutes.
2. The process of claim 1, wherein said grinding of the lactic acid polymers is carried out in the solid state until producing a grain size less than 5 millimeters.
3. The process of claim 1, wherein the lactic acid oligomers of step b) contain free hydroxyl and/or carboxyl terminal functional groups.
4. The process of claim 1, wherein the lactic acid oligomers of step b) contain at least one esterified hydroxyl and/or carboxyl terminal functional groups.
5. The process of claim 4, wherein prior to carrying out the mixing of step b), carboxyl terminal groups of the lactic acid oligomers to be used in said mixture are esterified with a mono-alcohol or a poly-alcohol having between 2 and 18 carbon atoms.
6. The process of claim 5, including the additional step of providing the mono-alcohol or the poly-alcohol having between 2 and 18 carbon atoms used in the esterification of the carboxyl terminal group of the lactic acid oligomer.
7. The process of claim 4, wherein prior to carrying out the mixing of step b), an acid is used to esterify a hydroxyl terminal group of the lactic acid oligomer to be used in said mixture.
8. The process of claim 7, including the additional step of providing the acid used in esterification of the hydroxyl terminal group of the lactic acid oligomer, wherein said acid has between 2 and 18 carbon atoms.
9. The process of claim 1, wherein the average molecular weight of the lactic acid oligomers used in the plasticization is between 200 and 2,000.
10. The process of claim 1, wherein the proportion by weight of the lactic acid oligomers compared to the total weight of the mixture is equal to or less than 45%.
11. The process of claim 1, wherein step b) is carried out by injecting.
12. The process of claim 1 wherein step b) is carried out by extruding.
13. The process of claim 1, wherein step b) is carried out by calendaring.
14. The process of claim 1 wherein step b) is carried out by moulding.

* * * * *